United States Patent Office 3,348,095
Patented Oct. 17, 1967

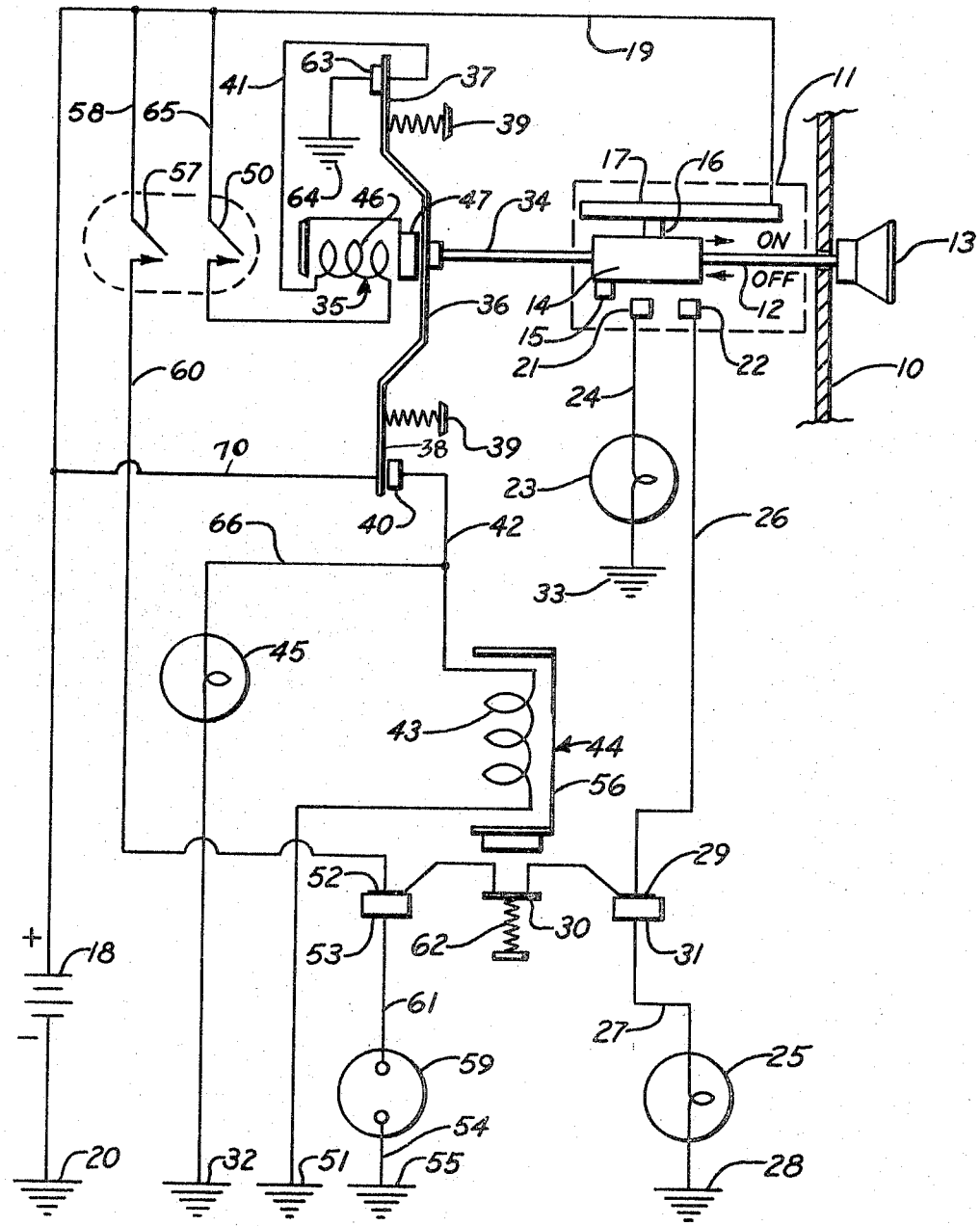

3,348,095
VEHICLE BATTERY POWER PROTECTION SYSTEM INCLUDING LIGHT SWITCHING MEANS
Howard M. Gold, 1155–100 St., Bay Harbor Island, Miami Beach, Fla. 33139
Filed Aug. 30, 1965, Ser. No. 483,614
7 Claims. (Cl. 315—80)

This invention relates to electrical systems for automotive vehicles and is more particularly directed to a system for preventing the wasting of battery power in automobiles.

The greatest drain or demand for power from a battery in an automotive vehicle is in starting the engine. With the advent of power steering, power brakes, air conditioning etc., it is paramount for proper operation of the motor vehicle that the battery be at peak power at all times. Therefore, it is necessary that there be no unnecessary draining of battery power such as having the headlights on when starting the automobile or leaving the headlights on after the ignition switch has been turned off. It is contemplated that the present invention prevents this unnecessary and unwarranted loss of battery power due to the operator's carelessness.

It is therefore the principal object of the present invention to provide an automotive vehicle with a battery power protection system which prevents the starting of a motor vehicle when the light switch is on, and also prevents the headlights or bright beam lights from being turned on when the ignition switch has been turned off, yet will permit the parking lights to be on when the ignition switch is off.

Another object of the present invention is to provide a battery power protection system for automotive vehicles which permits the headlights to be turned on only when the key is in the ignition and turned to the on position, but if an attempt is made to start the car with the headlights on, the power to the starter system is cut off automatically and the car is prevented from starting until the lights have been turned off.

A further object of the present invention is to provide a battery power protection system which may be readily adapted to the present conventional light and ignition systems for motor vehicles by minor changes in circuitry and the addition of two relays, is inexpensive in cost and most effective to prevent the usual careless operation of a motor vehicle from resulting in "dead" batteries.

A still further object of the present invention is to provide a battery power protection system that permits converting the existing system in an automobile with very little effort and expense, which will result in a saving in battery costs as well as permitting the existing battery to function at a higher efficiency.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Referring to the drawing on which there is shown a schematic diagram of my invention, the numeral 10 refers to a dashboard of an automobile on which a light switch 11 is mounted in the conventional manner. The light switch 11 is provided with a slide shaft 12 on one end of which is mounted a handle or knob 13 and on the other end is a body member 14 from which extend contact members 15 and 16. The contact member 16 is in constant engagement with a power contact terminal 17 that is connected by a line 19 to the positive side of a battery 18, the negative side of the battery 18 being grounded as at 20. The contact 15, on the other hand, assumes three positions, namely; in the completely retracted position of the knob 13, which is the first position, the contact 15 does not engage any terminals, and therefore no lights are energized. On withdrawing the knob 13 outwardly to its second position, the contact 15 will engage the parking light terminal 21 to energize parking lights 23 through the means of a connecting wire 24 and the ground 33 which completes the circuit to the battery 18. When the knob 13 is withdrawn to its outermost position, the contact 15 will engage the headlight terminal 22 to energize the headlights 25 through the means of wires 26, 27 and ground 28. The wires 26 and 27 are not connected together, but wire 26 is connected to a contact 29 which is an arm of a magnetic switch 30, and wire 27 is connected to a contact 31. The contacts 29 and 31 engage each other under certain conditions as explained in detail hereinafter. The switch 30 is provided with a second arm having a contact 52 which engages a contact 53 at the same time the contacts 29 and 31 are engaged.

To the conventional structure of the lights witch 11 as described above there is mounted a plunger 34 secured at one end to the rear portion of the switch body member 14, extending toward a control relay 35 and normally engaging a double pole yoke 36. When the light switch 11 is in its retracted position and the contact 15 is out of engagement with the light terminals 21 and 22, the plunger 34 will engage the yoke 36 of the control relay 35.

The control relay 35 consists of a coil 46 and a pole piece or armature 47, the latter being in contact relation with the yoke 36 when the light switch 11 is in its neutral or off position or when the coil 46 of the control relay has been energized.

The yoke 36 is provided with arm portions 37 and 38 that are positioned in proximity of contacts 63 and 40 respectively, with coil springs 39 connected to the yoke 36 for yieldingly urging the yoke 36 in the direction of the plunger 34. When the yoke 36 is permitted to move under the force of the coil springs 39 an is explained in detail hereinafter, the arm portion 38 will engage the contact 40 while the arm portion 37 will move out of engagement with the contact 63. The contact 63 is grounded as at 64. The arm portion 37 of the yoke 36 is connected by a wire 41 to one end of a coil 46 of the control relay 35 while the other end of the control relay coil 46 is connected in series with an ignition switch 50 by a wire 48. A wire 65 connects the ignition switch 50 to the battery connecting wire 19, while wire 70 connects the yoke 36 to the wire 19.

The contact 40 is connected to a wire 42 which extends to one end of a coil 43 of a power relay 44 and to a warning light 45 by means of a wire 66. The other end of the power relay 43 is grounded as at 51 while the warning light 45 is grounded as at 32.

The power relay 44 is provided with a pole piece or armature 56 which is positioned in proximity with the switch 30 whereby upon energizing the coil 43 of the power relay 44, the pole piece 56 will become magnetized attracting the metallic switch 30 and cause the switch 30 to open the contacts 29, 52 break the circuit at the contacts 31, 53 respectively, and thereby deenerize the headlights 25 as well as the start solenoid 59 which is connected by a wire 61 to the contact 53 and grounded as at 55 by a wire 54.

Also connected to the battery connecting wire 19 is a starter switch 57 by a wire 58 with a wire 60 connecting the starter switch 57 to the contact 52 of the magnetic switch 30. A coil spring 62 connected to the switch 30 yieldingly maintains the contacts 29, 31 and 52, 53 in a closed or engaged position. When the power relay 44 is energized, the magnetized pole piece 56 will draw the switch 30 in the direction to open the contacts 29, 31 and 52, 53 and break their respective circuits against the pull of the coil spring 62. This opens the starter circuit so that under this circumstance the automobile engine cannot be started. When the power relay 44 is deenergized, the coil spring 62 will move the switch 30 away from the power relay 44 causing the contacts 29, 52 to engage the contacts 31, 53 respectively, and thereby complete the circuits to the headlights 25 and the start solenoid 59 to permit the engine to be started.

When an automobile is not in use and the ignition and light switches are in their off position, the various parts constituting my invention are in the position shown by the drawing. As shown, the ignition switch 50, the start switch 57 and the light switch 11 are in the off position with the plunger 34 engaging the yoke 36. This arrangement results in the contact 38 of the contact yoke 36 to be out of engagement with the contact 40 so that the power relay 44 remains deenergized and the contacts 52, 53 and 29, 31 are in their closed or engaged positions. Also, the contact 37 will be in engaged position with the contact 63. The auto is readily started by merely turning on the ignition switch 50 which energizes the control relay 35 to lock the yoke 36 in its normal position with the contacts 38 and 40 out of engagement with each other and the contacts 37, 63 in engaged position. When the starter 57 is turned on, the start solenoid 59 will be energized to start the automobile since the contacts 52, 53 are in contact engagement. The parking lights 23 and the headlights 25 may now be turned on by withdrawing the knob 13 outwardly to the desired position. Since the energized coil 46 magnetized the pole piece 47, the yoke 36 is held firmly against movement in the direction for the contact 38 to disengage the contact 40 and for the contacts 37, 63 to become engaged.

If the ignition switch 50 is now turned off and the light switch 11 allowed to remain in the "on" position with contact 15 engaging the contact 22, the headlights 25 will automatically be cut off by virtue of the fact the coil 46 of the control relay 35 is deenergized when the ignition switch 50 is turned off. The coil spring 39 will now pull the yoke 36 so that the contact 38 engages the contact 40 to energize the power relay 44. Now, the switch 30 will be attracted by the magnetized pole piece 56 to break the circuits at contacts 52, 53 and 29, 31 so that the headlights 25 will be turned off. If the parking lights 23 had been turned on instead of the headlights 25, the parking lights 23 would stay energized since the contacts 29, 31 are not in the parking light circuit.

However, the automobile cannot be started with either the light switch 11 pulled out to turn on the parking lights 23 or the headlights 25 since the starting circuit is broken at the contacts 52, 53. The warning light 45 will be "on" to indicate to the operator of the automobile that he cannot start the automobile because the light switch 11 is "on." In order to start the automobile, the operator must first push the light switch knob 13 to its off position, causing the plunger 34 to engage the yoke 36 and the contacts 38 and 40 to be disengaged, then turn on the ignition switch 50 in order to magnetize the pole piece 47 to secure the yoke 36 against movement toward the contact 40.

From the above discussion taken in connection with the drawing it is readily understood that my system permits the headlights 25 to be "on" only when the engine is running or when the operator deliberately turns on the ignition switch prior to the headlights being turned on. Also if the operator turns off the ignition switch without turning off his lights, the headlights 25 will automatically be turned off as the warning light 45 turns on, but allowing the parking lights to be on. The operator cannot start the engine until he first returns the light switch 11 to its "off" position when the warning lights 45 are automatically turned off and the start circuit is returned to its original ready condition.

Also, the existing conventional light and ignition system of the present automobiles may be readily converted. All that needs to be done is merely add the plunger 34 to the light switch body member 14 of the light switch 11, insert the power relay 44 and control relay 35 and contacts 37, 40, 63, 38, 52, 53, 29 and 31 in their appropriate positions in the circuitry. The cost of the conversion in money and effort is nominal, while the results attained thereby are most effective to prevent the unnecessary draining of the battery power which results in the improper functioning of an automobile.

What I claim as new and desire to secure by Letters Patent of the United States is:

1. In an ignition system for an automotive vehicle having a battery, an ignition switch, a start switch, a start solenoid, a light switch and wire means connecting the positive pole of said battery to said start switch, said ignition switch and said light switch, the combination comprising a power relay, switch means having a pair of terminals mounted in proximity of said power relay, a pair of contact members, spring means yieldingly urging said terminals of said switch means in contact relation with said contact members whereby upon energizing said power relay said switch means moves said terminals out of contact with said contact members, a control relay, a yoke extending across said control relay and having arm portions, one of said arm portions being in spaced relation to a third contact member while the other of said arm portions engaging a fourth contact member, spring means yieldingly urging said one of said arm portions of said yoke in contact relation with said third contact member and said other of said arm portions out of contact relation with said fourth contact member, means grounding said fourth contact member, wire means connectnig said yoke and one end of said coil of said control relay, said other end of said control relay being connected to said ignition switch, wire means connecting said third contact member and said power relay, means grounding said power relay, a warning light connected in parallel with said power relay, wire means connecting said yoke and said positive pole of said battery, extension means mounted on said light switch and engaging said yoke and preventing movement thereof in the direction of said third contact member, means connecting said start solenoid and said one of said first named contact members, headlight means mounted in series with said other of said first named contact members and a ground and wire means connecting said other of said terminals and said light switch whereby upon sliding said light switch to energize said headlight means said headlight means will not light unless said ignition switch has been first actuated to energize said control relay.

2. In an ignition system for an automotive vehicle having a battery, an ignition switch, a start switch, a start solenoid, a light switch and wire means connecting the positive pole of said battery to said start switch, said ignition switch and said light switch, the combination comprising a magnetic switch having a first pair of contacts in normal engagement with a second pair of contacts, means connecting said start solenoid and one of said second pair of contacts, a control relay, a yoke positioned in proximity of said control relay, wire means connecting said yone and said control relay, said yoke having arm portions, a third contact mounted in spaced relation to one of said arm portions of said yoke, the other of said arm portions engaging a fourth contact member, spring means yieldingly urging said one of said arm portions into contact relation with said third contact and said other of said arm portions out of engagement with said fourth contact member, means mounted on said light switch preventing movement of said one of said arm portions in the direction of said third contact and a power relay mounted in proximity of said magnetic switch and in series with said third contact and said battery whereby upon actuating said light switch, said one of said arm portions of said yoke engages said third contact to energize said power relay and open the circuit at said pairs of contacts and prevent energizing said start solenoid.

3. In an ignition system for an automotive vehicle having a battery, an ignition switch, a start switch, a start solenoid, a light switch and wire means connecting the positive pole of said battery to said start switch, said ignition switch and said light switch, a headlight, the combination comprising a magnetic switch having a first pair of contacts in normal engagement with a second pair of contacts, spring means yieldingly urging said first and second pair of contacts into engagement, means connecting said start solenoid and one of said second pair of contacts, a control relay, a yoke positioned in proximity of said control relay, said yoke having arm portions and connected to said relay, a third contact mounted in spaced relation to one of said arm portions of said yoke, the other of said arm portions engaging a fourth contact member, spring means yieldingly urging said one of said arm portions into contact relation with said third contact and said other of said arm portions out of engagement with said fourth contact member, means mounted on said light switch preventing movement of said one of said arm portions of said yoke in the direction of said third contact, means connecting said other of said pairs of first contacts in series with said light switch and said headlight and a power relay mounted in proximity of said magnetic switch and in series with said third contact and said battery whereby upon actuating said light switch, said one of said arm portions of said yoke engages said third contact to energize said power relay and open the circuit at said pair of contacts and prevent energizing said ignition switch and said headlight.

4. In an ignition system for an automotive vehicle having a battery, an ignition switch, a start switch, a solenoid, a light switch, wire means connecting the positive pole of said battery to said start switch, said ignition switch and said light switch, the combination comprising a magnetic switch having a first pair of contacts in normal engagement wtih a second pair of contacts, means connecting said start solenoid and one of said second pair of contacts, a control relay connected in series with said ignition switch, a yoke positioned in proximity of said control relay, said yoke having arm portions and connected to said relay, a third contact mounted in spaced relation to one of said arm portions, a fourth contact mounted in engagement with the other of said arm portions, spring means yieldingly urging said one of said arm portions of said yoke into contact relation with said third contact and said other of said arm portions out of engagement with said fourth contact, means mounted on said light switch preventing movement of said one of said arm portions of said yoke in the direction of said third contact and a power relay mounted in proximity of said magnetic switch and in series with said third contact and said battery, a warning light connected in parallel with said power relay whereby upon actuating said light switch, said one of said arm portions engages said third contact to energize said power relay and said warning light and open the circuit at said pairs of contacts to prevent energizing said start solenoid.

5. In an ignition system for an automotive vehicle having a battery, an ignition switch, a start switch, a start solenoid, a light switch, wire means connecting the positive pole of said battery to said start switch, said ignition switch and said light switch, the combination comprising a magnetic switch having a first pair of contacts in normal engagement with a second pair of contacts, one of said contacts of said second pair connected to said start solenoid springs means yieldingly urging said first and second pair of contacts in engagement, a control relay connected in series with said ignition switch, a yoke positioned in proximity of said control relay, said yoke having arm portions connected to said relay, a third contact mounted in spaced relation to one of said arm portions of said yoke, spring means yieldingly urging said one of said arm portions of said yoke into contact relation with said third contact, means mounted on said light switch preventing movement of said yoke in the direction for said one of said arm portions to engage said third contact, means connecting said one of said first pair of contacts in series with said start switch and the other of said first pair of contacts with said headlight and a power relay mounted in proximity of said magnetic switch and in series with said third contact, a warning light connected in parallel with said power relay whereby upon actuating said light switch, said one of said arm portions of said yoke engages said third contact to energize said power relay and said warning light and open the circuit at said pairs of contacts to prevent energizing said start solenoid.

6. In an ignition system for an automotive vehicle having a battery, an ignition switch, a start switch, a start solenoid, a light switch, wire means connecting the positive pole of said battery to said start switch, said ignition switch and said light switch, a headlight, the combination comprising control relay means connected to said ignition switch, power relay means connected to said control relay means whereby upon energizing said control relay means said power relay means remains non-energized, relay operated switch means connected to said start switch and said light switch, terminals positioned normally in contact relation with said relay operated switch means connected to said start solenoid and said headlight and means mounted on said light switch operatively connected to said control relay means whereby upon actuation of said light switch said control relay operates to energize said control relay and effect the actuation of said relay operated switch means to prevent energizing said solenoid and said headlight.

7. In an ignition system for an automotive vehicle having a battery, an ignition switch, a start switch, a start solenoid, a light switch, wire means connecting the positive pole of said battery to said start switch, said ignition switch and said light switch, a headlight, the combination comprising control relay means connected to said ignition switch, power relay means connected to so control relay means whereby upon energizing said control relay means said power relay means remains non-energized, warning light means connected in parallel with said power relay means, relay operated switch means connected to said start switch and said light switch, terminals positioned normally in contact relation with said relay operated switch means connected to said start solenoid and said headlight and means mounted on said light switch operatively connected to said control relay means whereby upon actuation of said light switch said control relay operates to energize said control relay and effect the actuation of said relay operated switch means to prevent energizing said solenoid and said headlight while said warning light is energized to indicate that said light switch has been actuated.

References Cited
UNITED STATES PATENTS 2,449,338   9/1948   Summersett _____ 315—80
2,913,589   11/1959  Bell _____ 315—83 X DAVID J. GALVIN, Primary Examiner.

JAMES W. LAWRENCE, Examiner.

P. C. DEMEO, Assistant Examiner.